(12) United States Patent
Shim

(10) Patent No.: US 6,466,883 B1
(45) Date of Patent: Oct. 15, 2002

(54) AUTOMATIC TRANSMISSION ACCUMULATOR PISTON DISPLACEMENT DETECTING DEVICE AND METHOD THEREOF

(75) Inventor: Hyun-Soo Shim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/472,173

(22) Filed: Dec. 27, 1999

(30) Foreign Application Priority Data

Jul. 28, 1999 (KR) .............................................. 99-30851

(51) Int. Cl.[7] ................................................ G06F 3/03
(52) U.S. Cl. ............................ 702/94; 702/33; 702/114
(58) Field of Search ............................ 702/33, 94, 114; 74/335, 869; 60/490; 180/307; 477/61; 701/97

(56) References Cited

U.S. PATENT DOCUMENTS

| | | | |
|---|---|---|---|
| 3,969,732 A | * 7/1976 | Fitzgerald | 91/414 |
| 4,432,255 A | * 2/1984 | Borman et al. | 74/869 |
| 4,674,345 A | * 6/1987 | Furukawa et al. | 74/335 |
| 5,089,964 A | * 2/1992 | Morishige et al. | 364/424.1 |
| 6,076,414 A | * 6/2000 | Tabata et al. | 74/335 |
| 6,178,372 B1 | * 1/2001 | Tabata et al. | 701/97 |

* cited by examiner

*Primary Examiner*—Marc S. Hoff
*Assistant Examiner*—Felix Suarez
(74) *Attorney, Agent, or Firm*—Birch, Stewart, Kolasch & Birch, LLP

(57) ABSTRACT

An accumulator piston displacement detecting device for an automatic transmission includes a friction element, a hydraulic line for supplying and releasing hydraulic pressure to the friction element, an accumulator connected to the friction element through the hydraulic line for regulating the hydraulic pressure being supplied to the friction element, a switch installed in a portion of the accumulator, and a TCU for controlling the hydraulic pressure supplied to the friction element on the basis of a signal from the switch.

6 Claims, 3 Drawing Sheets

AUTOMATIC TRANSMISSION ACCUMULATOR PISTON DISPLACEMENT DETECTING DEVICE AND METHOD THEREOF

BACKGROUND OF THE INVENTION (a) Field of the Invention

The present invention relates to an accumulator in a vehicle automatic transmission and, more particularly, to an accumulator piston position detecting device of a piston type accumulator which permits a transmission control unit (TCU) to detect the displacement of the piston in real-time so as to use the detected data as information for determining a duty rate for applying hydraulic fluid to a friction element.

(b) Description of the Related Art

Generally, an automatic transmission includes a planetary gear system having several planetary gear sets and friction elements, such as clutches and brakes, for providing various forward and reverse speed ranges. To operate the friction elements, hydraulic pressure is used and a TCU controls the hydraulic pressure for applying or releasing the hydraulic pressure to or from the clutches and brakes.

FIG. 4 shows a friction element of an automatic transmission. As shown in FIG. 4, the friction element 50 includes an accumulator 60 having a plug 61 and spring 62 such that the accumulator regulates hydraulic pressure applied to the friction element 50.

The hydraulic pressure applied to the friction element 50 is controlled by a duty control signal from the TCU, which produces the duty control signal on the basis of data detected by various sensors for sensing vehicle conditions and derived piston displacement data.

That is, the TCU determines whether or not the friction element 50 is engaged on the basis of the derived piston displacement data.

In this case, the TCU uses a derived value calculated on the basis of an oil temperature calibration factor and an engine revolution per minute (rpm) calibration factor with derived piston displacement data saved in memory for determining engagement of the friction element.

However, since the stroke displacement is not detected in real-time, the determination by the TCU as to whether or not the friction element is engaged is not precise. Accordingly, the duty ratio for controlling hydraulic pressure cannot be precisely calculated.

SUMMARY OF THE INVENTION

The present invention has been made in an effort to solve the above problem of the prior art.

It is an object of the present invention to provide an accumulator piston displacement detecting device and method thereof by which the TCU can precisely control the hydraulic pressure so as to minimize shift shock and improve shift performance, resulting in ride comfort of a vehicle.

To achieve the above object, the accumulator piston displacement detecting device for an automatic transmission of the present invention comprises a friction element, a hydraulic line for supplying and releasing hydraulic pressure to the friction element, an accumulator connected to the friction element through the hydraulic line for regulating the hydraulic pressure being supplied to the friction element, a switch installed in a portion of the accumulator, and a TCU for controlling the hydraulic pressure supplied to the friction element on the basis of a signal from the switch.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
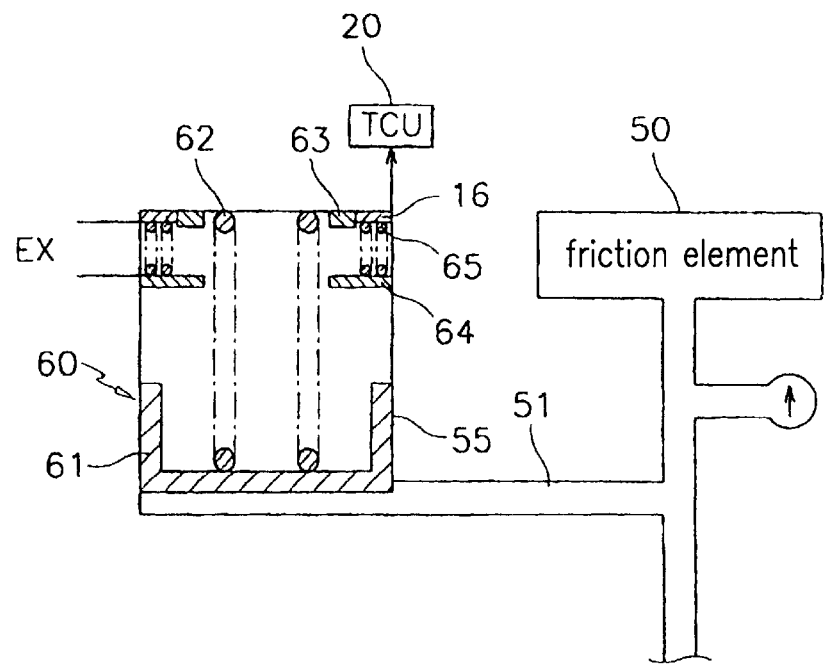
FIG. 1 is a schematic view showing a piston displacement-detecting device of a friction element according to a preferred embodiment of the present invention.

FIG. 1 shows an accumulator piston displacement-detecting device according to the preferred embodiment of the present invention.

As shown in FIG. 1, the accumulator piston displacement-detecting device includes a friction element 50 and an accumulator 60 connected to the friction element 50 by a hydraulic line 51.

The accumulator 60 includes a casing 55, a piston 61 installed in the casing 55, a spring 62 of which respective ends are fixed at the upper surface of the piston 61 and at the ceiling of the casing 55 so as to elastically push the piston 61 downward away from the ceiling, an accumulator switch 16 mounted on a top portion of the casing 55 for detecting the position of the piston 61, and a TCU 20 for controlling hydraulic pressure applied to a friction element 50 on the basis of the data signal from the accumulator switch 16.

The accumulator switch 16 includes a contacting point 63 fixed on the ceiling of the casing 55, a movable contacting member 64 which reciprocates according to the movement of the piston 61, and a second spring 65 which elastically connects the contacting point 63 to the movable contacting member 64.

Figure 2:
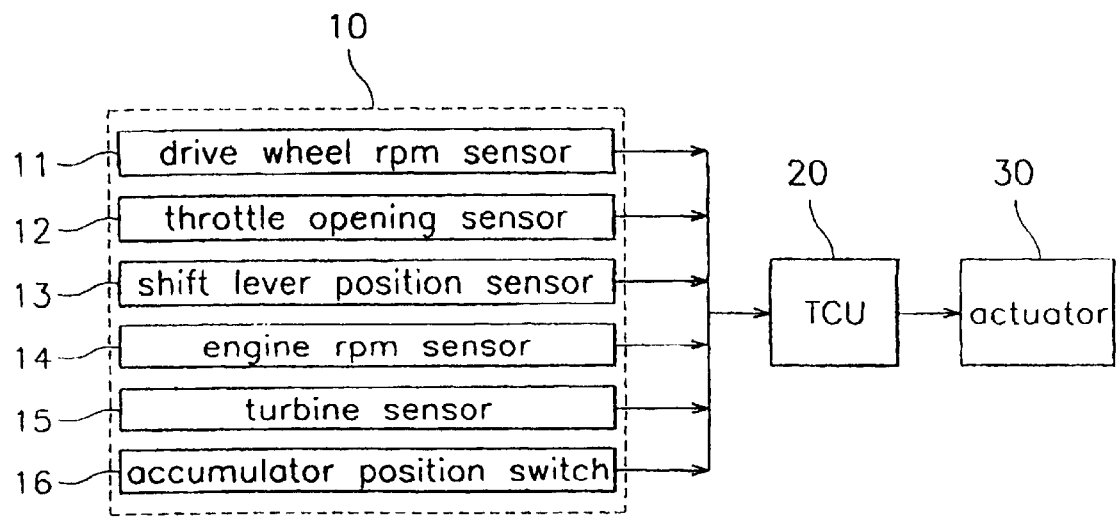
FIG. 2 is a block diagram showing a piston displacement control system for displacement detecting device of FIG. 1.

FIG. 2 shows a block diagram of a piston displacement control system for the displacement detecting device of FIG. 1. As shown in FIG. 2, the piston displacement control system includes a vehicle condition detector 10 for detecting vehicle conditions and responsively produce vehicle condition signals, a TCU 20 which receives the vehicle condition signals from the vehicle condition detector 10 and responsively produces a duty control signal on the basis of the vehicle condition signals, and an actuator 30 for adjusting hydraulic pressure applied to the friction element 50 according to a duty control signal from the TCU 20.

The vehicle condition detector 10 includes a drive wheel rpm sensor 11 for sensing a drive wheel rpm and responsively producing a drive wheel rpm signal, a throttle opening sensor 12 for sensing an amount of throttle opening and responsively producing a throttle opening signal, a shift lever position sensor 13 for sensing a shift lever position and responsively producing a shift lever position signal, an engine rpm sensor 14 which calculates an engine rpm on the basis of an ignition pulse and responsively produces an engine rpm signal, a turbine rpm sensor 15 which calculates a turbine rpm on the basis of the drive wheel rpm and responsively produces a turbine rpm signal, and an accumulator piston accumulator switch 16 for detecting the behavior of accumulator piston 61.

A method of detecting the position of the accumulator piston according to the preferred embodiment of the present invention will be hereinafter described with reference to FIG. 3.

Figure 3:
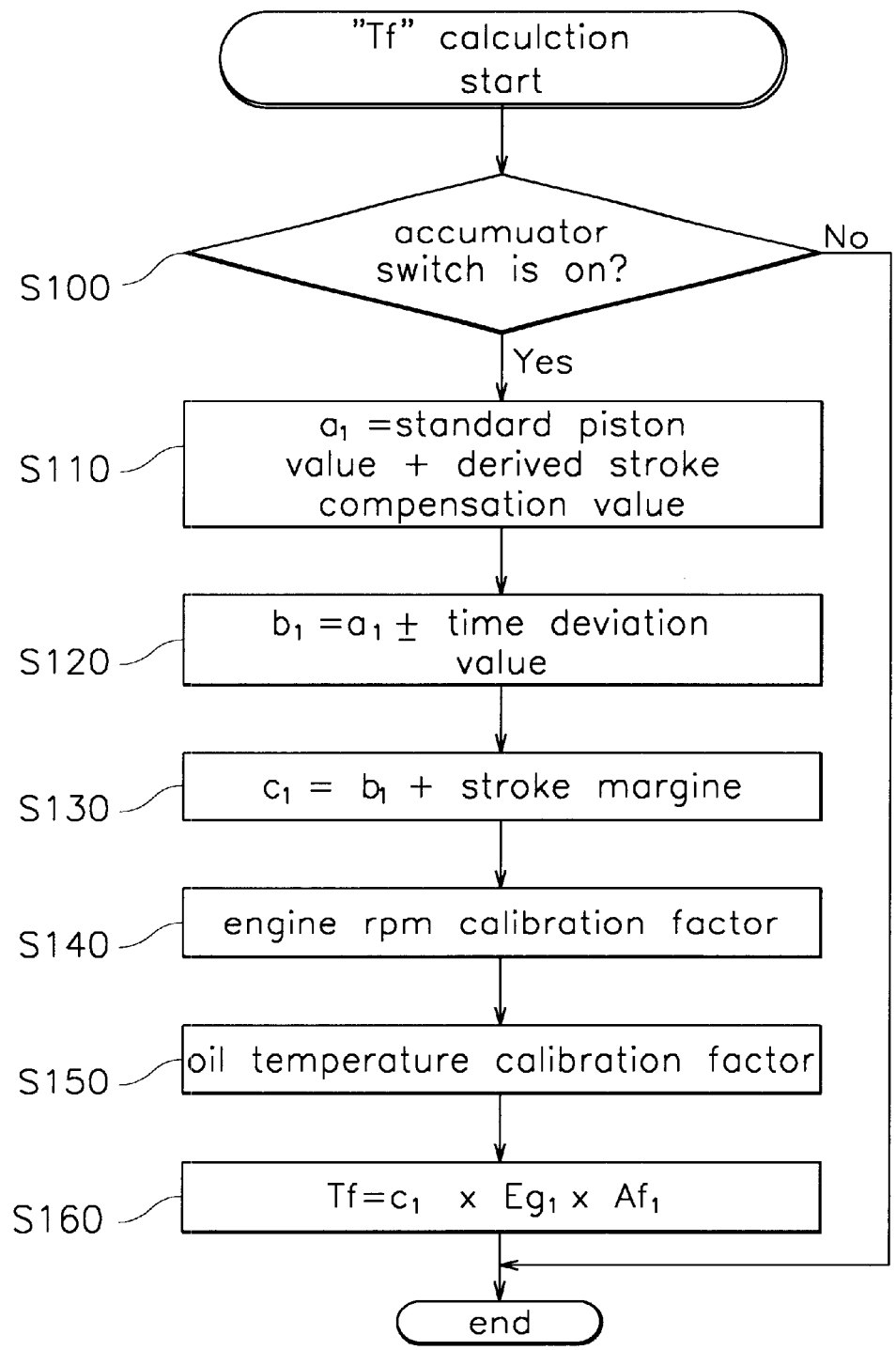
FIG. 3 is a flow chart showing a method for detecting piston displacement according to the preferred embodiment of the present.
Figure 4:
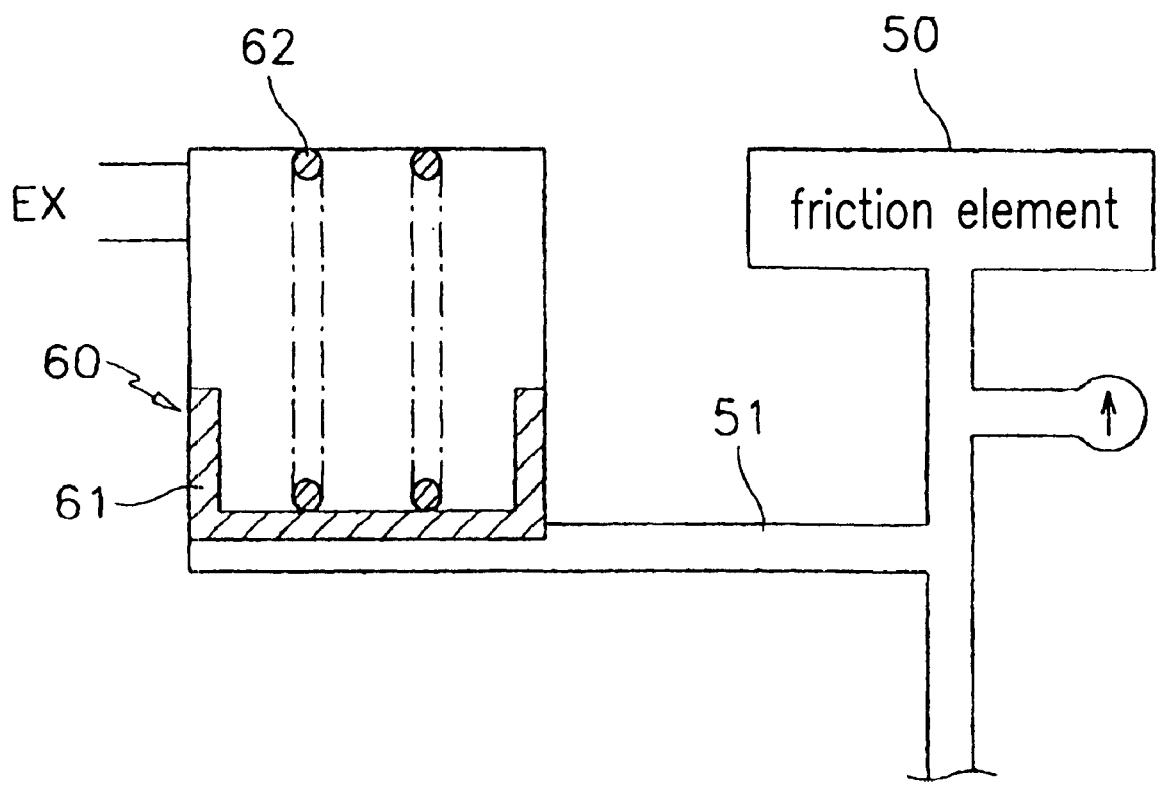
FIG. 4 is a schematic view showing an accumulator of the prior art.

As shown in FIG. 3, the TCU 20 determines whether or not the accumulator switch 16 is turned on in step S100. If the accumulator switch is turned on, the TCU 20 first calculates a first piston stroke compensation value "$a_1$" by adding in step S110 a derived stroke compensation value to a standard piston stroke value saved in a memory, and then calculates in step S120 a second piston stroke compensation value "$b_1$" by adding or subtracting a time deviation value "Δt-on" to or from the first stroke compensation value "$a_1$." Following this, the TCU 20 calculates in step S130 the third piston stroke compensation value "$c_1$" by adding to the second stroke compensation value "$b_1$" a standard stroke margin "sp1" saved in memory. Then, the TCU 20 calculates an engine rpm calibration factor "$Eg_1$" in step S140, and an oil temperature calibration factor "$Af_1$" in step S150.

Finally, the TCU 20 calculates a shift beginning fill-time "Tf" by multiplying the third piston stroke compensation value "$c_1$" with the engine rpm calibration factor "$Eg_1$," and the oil temperature calibration factor "$Af_1$" in step S160.

When up- or down-shifting is performed, the TCU 20 sends initial open loop and feedback control signals to the actuator 30. The actuator 30 is duty-controlled according to the duty control signal from the TCU 20 such that it adjusts the position of a hydraulic control valve's valve piston (not shown). The hydraulic fluid supplied through the hydraulic control valve is applied to the friction element 50 and to the accumulator 60 at the same pressure level such that a fluctuation of the hydraulic pressure applied to the friction element 50 is regulated by the reciprocating movement of the accumulator piston 61. Due to the resulting hydraulic pressure regulation by the accumulator 60, the engagement of the friction element is smoothly performed.

If the hydraulic pressure applied to the accumulator 60 reaches a predetermined level so as to push the piston 61 upward toward the casing ceiling, the piston pushes the movable contacting member 64 such that the movable contacting member contacts with the contacting point 63. Accordingly, the accumulator switch 16 is turned on.

Once the accumulator switch 16 is turned on, the TCU 20 calculates the fill-time value "Tf" of the initial duty control signal for adjusting initial shift pressure on the basis of the operating signal from the accumulator switch 16.

That is, if the TCU 20 receive the operating signal from the accumulator switch 16, the TCU 20 calculates the first stroke compensation value "$a_1$" by adding a standard piston arrival time "s1," a value which is saved in memory according to an initial output duty ratio "Da" of each friction element, to a stroke compensation value "sm1" (see FIG. 3).

The stroke compensation value "sm1" is calculated by the following equation 1.

$$sm1=(s1+sm1_{(n-1)}) \times Kt \times Ke \qquad \text{Equation 1}$$

sm1: stroke compensation value
s1: standard stroke value
$sm1_{(n-1)}$: previous stroke compensation value Kt: oil temperature calibration factor
Ke: engine rpm calibration factor Consequently, the TCU 20 calculates the second stroke compensation value "$b_1$" by adding or subtracting a time deviation value "Δt-on" to or from the first stroke compensation value "$a_1$."

The time deviation value "Δt-on" of the accumulator switch 16 is calculated by the following equation 2.

$$\Delta t\text{-on}=t\_base\_on-t\_on\_s \qquad \text{Equation 2}$$

Δt-on: time deviation value of the duration that the accumulator switch is on
t_base_on: standard duration that the accumulator switch is on
t_on_s: measured duration that the accumulator switch is on Then, the TCU 20 calculates the third piston stroke compensation value "$c_1$" by adding the stroke margin "sp1" saved in memory to the second piston stroke compensation value "$b_1$." Also, the TCU 20 calculates the engine rpm calibration factor "$Eg_1$" according to continuously-varying engine rpm "Ne" so as to compensate for the engine rpm. The oil temperature calibration factor "$Af_1$" that is a function of the time-variable oil temperature is also included in this calculation so as to compensate for the oil temperature.

Finally, the TCU 20 calculates a shift beginning fill-time "Tf" by multiplying the third piston stroke compensation value "$c_1$" with the engine rpm calibration factor "$Eg_1$" and the oil temperature calibration factor "$Af_1$."

After the shift beginning fill-time "Tf" for adjusting the pressure applied to the friction element 50 in the shift initiation period, the TCU 20 reduces the shift initiation duty ratio of 100% to 0% and then adjusts the shift begin fill time "Tf" in order to supply a maximal hydraulic pressure to the friction element during the shift beginning fill-time calculated above.

Accordingly, when the hydraulic pressure is supplied to the friction element according to the shift begin fill time "Tf," plates (not shown in the drawings) approach a clutch as much as the piston moves, such that the TCU can determines whether or not the friction element 50 is in engagement.

As described above, in the accumulator piston displacement detecting device and method in the present invention, the piston switch of the accumulator is turned on or off according to the hydraulic pressure supplied to the friction element, and the TCU can precisely determines whether the friction element is engaged or not, resulting in a reduction of the generation of shift shock. As result, a ride comfort of the vehicle is enhanced by the improved shift performance of the transmission.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. An accumulator piston displacement detecting device for an automatic transmission, comprising:
   a friction element;
   a hydraulic line for supplying and releasing hydraulic pressure to the friction element;
   an accumulator connected to the friction element through the hydraulic line for regulating the hydraulic pressure being supplied to the friction element;

a switch installed in a portion of the accumulator; and a TCU for controlling the hydraulic pressure supplied to the friction element on the basis of a signal from the switch by, calculating a piston stroke compensation value if the switch is turned on according to movement of a piston toward a ceiling of a casing thereof, calculating an engine rpm calibration factor and oil temperature calibration factor, and calculating a shift beginning fill-time by multiplying the piston stroke compensation value with the engine rpm calibration factor and the oil temperature calibration factor.

2. An accumulator piston displacement detecting device of claim 1 wherein the accumulator comprises said casing, said piston installed in said casing which reciprocates according to the hydraulic pressure supplied or released to or from the friction element, a spring of which one end is fixedly connected to the casing and the other is connected to the piston so as to elastically push the piston in a direction away from a ceiling of the casing.

3. An accumulator piston displacement detecting device for an automatic transmission, comprising:

a friction element;

a hydraulic line for supplying and releasing hydraulic pressure to the friction element;

an accumulator connected to the friction element through the hydraulic line for regulating the hydraulic pressure being supplied to the friction element;

a switch installed in a portion of the accumulator; and a TCU for controlling the hydraulic pressure supplied to the friction element on the basis of a signal from the switch, wherein the switch comprises a contacting point fixed on a ceiling of a casing, a movable contacting member which reciprocates according to the movement of a piston within the casing, and a second spring which elastically connects the contacting point to the movable contacting member.

4. A method of detecting a position of the accumulator piston comprising the steps of:

calculating a piston stroke compensation value if the switch is turned on according to movement of the piston toward the ceiling of the casing;

calculating an engine rpm calibration factor and oil temperature calibration factor; and calculating a shift beginning fill-time by multiplying the piston stroke compensation value with the engine rpm calibration factor and the oil temperature calibration factor.

5. A method of claim 4 further comprising of the steps of:

calculating a first piston stroke compensation value by adding a derived stroke compensation value to a piston stroke standard value stored in a memory;

calculating a second piston stroke compensation value by adding or subtracting a time deviation value to or from the first stroke compensation value; and calculating the third piston stroke compensation value by adding a standard stroke margin saved in memory to the second stroke compensation value.

6. An accumulator piston displacement detecting device of claim 2 wherein the accumulator comprises said casing, a piston installed in the casing which reciprocates according to the hydraulic pressure supplied or released to or from the friction element, a spring of which one end is fixedly connected to the casing and the other is connected to the piston so as to elastically push the piston in a direction away from a ceiling of the casing.

* * * * *